United States Patent [19]

Strauss

[11] Patent Number: 5,152,202
[45] Date of Patent: Oct. 6, 1992

[54] TURNING MACHINE WITH PIVOTED ARMATURE

[75] Inventor: Gary Strauss, Rockford, Ill.
[73] Assignee: The Ingersoll Milling Machine Company, Rockford, Ill.
[21] Appl. No.: 725,646
[22] Filed: Jul. 3, 1991
[51] Int. Cl.$^5$ .............................................. B23B 21/00
[52] U.S. Cl. ...................................... 82/134; 82/137; 82/138; 82/123; 82/904
[58] Field of Search .................. 82/132, 133, 123, 137, 82/138, 154, 904, 134; 409/131, 132, 199, 200; 51/49, 58, 289 R; 29/888.08, 888.1, 888.04; 310/12; 318/135

[56] References Cited

U.S. PATENT DOCUMENTS

| | | | |
|---|---|---|---|
| 3,665,798 | 5/1972 | Tapert et al. | 83/575 |
| 3,688,612 | 9/1972 | Haruta et al. | 82/134 |
| 3,691,613 | 9/1972 | Wauk | 82/137 X |
| 4,450,737 | 5/1984 | Hitt | 82/137 |
| 4,646,596 | 3/1987 | Edwards et al. | 82/118 X |
| 4,831,290 | 5/1989 | Clauss et al. | 310/12 |

Primary Examiner—Larry I. Schwartz
Assistant Examiner—J. R. Daulton
Attorney, Agent, or Firm—Fitch, Even, Tabin & Flannery

[57] ABSTRACT

The invention relates to a high speed turning machine for machining a rotating workpiece to have a predetermined profile surface by using a cutting tool mounted on a pivotal tool holder that is reciprocated rapidly toward and from the workpiece surface. An armature of a linear motor is mounted on the pivotal toolholder. The toolholder is mounted in frictionless bearings. The armature is positioned on the toolholder relative to the tool and its pivot axis to provide a substantial mechanical advantage.

10 Claims, 4 Drawing Sheets

TURNING MACHINE WITH PIVOTED ARMATURE

BACKGROUND OF THE INVENTION

This invention relates to a high speed turning machine for machining a rotating workpiece to have a predetermined profile surface by means of a cutting tool that is reciprocated rapidly toward and from the workpiece surface.

The present invention is directed to high speed turning tools in which the workpiece is rotated at high speed and a cutting tool is reciprocated at high speed into and from engagement with the rotating workpiece surface to provide a particular profile thereto. The tool is brought into engagement with a turning surface on the workpiece and the tool movement is controlled and programmed to form a non-circular surface such as for a piston skirt, a cam shaft, or journals etc. for automotive engines. As will be explained hereinafter, the tool may be brought into contact with an end face of the rotating workpiece to perform a facing operation or into contact with an internal surface in a bore to a boring operation on the rotating workpiece. In the first instance, of a piston turning operation, the tool moves transverse to the spinning axis of the workpiece, whereas in the end-facing instance, the tool moves parallel to the spinning axis of the workpiece.

The present invention will be described hereafter principally in connection with a piston turning operation in which the workpiece is rotated by a spindle assembly with the tool moving at right angles to the turning axis to machine the workpiece and the toolholder is carried axially in a direction parallel to the turning axis to cut a non-circular profile along the outer surface of the piston skirt. In prior machines of this general kind, the tool was mounted on the end of a steel shaft which wa mounted for sliding movement within a linear motor with the armature also being carried on the steel shaft. The linear motor was a high response linear motor, the stroke of which was controlled by a computer program operating to control the tool tip location relative to a point on the rotating part. Variations from the profile geometry are made automatically by modifying the computer program. Displacement errors are gauged and out of tolerance conditions are corrected automatically through a close looped feedback system. The particular system was found to be fairly responsive to the needs of the customer. These machines though, in actual use, suffered from a number of shortcomings, including a lack of stiffness, a relatively high moment of inertia, a limited response speed and relatively high friction.

The response of the toolholder and its servo become a limiting factor in these prior art machines because of their bandwidth. The bandwidth of the toolholder and servo system is defined as the range of frequencies with which the assembly will respond when forced with a control signal. The bandwidth of a toolholder and servo depend upon five basic factors which are the maximum cutting force required, the inertia of the toolholder, the toolholder range of motion, frictional forces and the servo force capacity.

Generally, the higher the inertia of the toolholder and servo, the lower will be the inherent bandwidth of the combination. For a particular physical configuration, the maximum frequency of response will be limited by this factor. Reducing inertia (particularly mass) of the moving parts of a toolholder and servo combination will increase this limit for a servo with a specific force capacity. The present invention is directed to providing a very substantial increase in stiffness, a reduction in moment of inertia, an increase in speed and in accuracy of cutting to provide a higher production and better finish on the workpiece, as will be described hereinafter.

In prior art turning machines of this type, the tool was carried on the end of a metal shaft which reciprocated on bearings along a linear path and which carried an armature of a linear motor. The high moment of inertia of the metal shaft carrying the tool and the linear motor armature caused the tool to overshoot in the direction of its movement. Also, to provide greater maximum cutting forces, the tool and toolholder were relatively massive resulting in this greater moment of inertia thereby reducing the response time to stop the tool, to reverse its direction of travel without a large overshoot travel, and to accelerate the tool's travel in the opposite direction. When excessive electrical power was applied to the tool and armature shaft to attempt to get greater cutting forces in these prior cutting machines, the tool shaft tended to overshoot and then vibrate. Thus, there is a need to provide a new and improved toolholder and linear motor arrangement which very substantially reduces the moment of inertia of the toolholder and tool.

One conventional piston turning machine with the reciprocating tool shaft carrying the armature of the linear move had a limit stiffness of about 150,000 lbs in. Stiffness as used herein defined as the resistance to tool deflection under cutting load. The greater stiffness not only results in more cut material being removed but also results in better control over where the tool point is located at any given point in time. For reasons to be explained hereinafter, the stiffness of the tool of this invention over the prior art machine may be almost twenty-fold. This increased stiffness and results in better surface finishes and can eliminate one or more finish cuts required with the conventional equipment thereby substantially increasing the rate of production.

Usually, bandwidth is lost when it is desired to increase the cutting force because more massive and powerful servos are used to generate the cutting force but at the expense of increasing the inertia of the system. Further, the more heavily loaded a servo mechanism becomes, the more sluggish is its response to a demand for accelerations and direction changes. As will be explained in connection with this invention, the cutting force may be increased substantially by mounting the armature and toolholder relative to the tool to provide a mechanical advantage in excess of two. Thus, the cutting force may be increased over the prior art systems without the use of more massive motors or servos.

These conventional piston turning machines had a heavy metal shaft carrying the cutting tool and the armature; and the shaft was mounted in bearings or slide bushings which generate considerable friction. Friction is a loss that requires electrical energy and force from a motor to be overcome. Frictional forces reduce system bandwidths because of the thermal and mechanical energy losses they produce. Decreasing frictional forces will produce a higher bandwidth. An earlier prior art machine included a camming wedge transfer means that produce high friction and wear on the wedge surfaces. High wear surfaces add looseness into the system that must be accounted for. The present invention mounts the toolholder and the linear motor armature in a manner to reduce the friction very substantially and thereby maintain a high bandwidth.

The response or range of frequency or bandwidth determines how rapidly the tool can be moved and thereby is an important factor in the rate of machining. If the tool and tool holder can not be moved rapidly and through small increments of movement in these machines, the rotational speed of the workpiece must be reduced. The conventional machine being described herein reciprocated the tool about 40 cps and the workpiece was rotated at 1,300 rpm. The other prior art machine, which is described herein, had a tool reciprocate within the range of 60 to 70 cps with the work piece rotating at about 2,200 rpm. As will be explained in greater detail hereinafter, the present invention provides a substantial increase in both tool reciprocation, e.g. 100-130 cps and a workpiece rotation in excess of 3,000 rpm. These higher speeds for cutting result in finer finishes, more machining per unit time and better production of finished workpieces.

As a general principle, the longer the stroke or range of motion required by the toolholder and servo, the lower the bandwidth. The range of motion of the tool of the present invention may be kept quite small, e.g. about one-half inch or less. Heretofore, prior art machines described herein had a longer stroke or range of motion, e.g. about one inch that lowered the bandwidth.

From the foregoing, it will be seen that the present invention addresses and provides improvements in the five basic factors for the bandwidth of a toolholder and servo, which are: the maximum cutting force required, the inertia of the toolholder, toolholder range of motion, frictional forces and the servo capacity.

Thus, a general object of the invention is to provide a new and improved high speed turning machine of the foregoing kind.

SUMMARY OF THE INVENTION

The present invention comprises a frame with means on the frame such as a spindle assembly to rotate the workpiece at a high rate of speed. A toolholder on the frame is mounted to reciprocate the tool into cutting engagement with the workpiece to machine the surface to a predetermined profile, usually a non-circular profile. An armature of a linear motor is mounted on a pivotally mounted toolholder to reduce substantially the apparent moment of inertia of the combined toolholder and armature. The toolholder is mounted in frictionless bearing to reduce friction forces that must be overcome with pivoting of the toolholder and armature. The armature is positioned on the toolholder relative to the tool and its pivot axis to provide a substantial mechanical advantage to increase substantially the application force of the tool against the workpiece.

In the preferred embodiment of the invention, the armature is mounted at the upper end of the toolholder which is pivotally mounted in frictionless bearings at the lower end of the toolholder. The tool is mounted intermediate the ends to give a mechanical advantage in excess of two.

The method of operating the invention involves providing a tool stiffness in excess of 1,000,000 lbs. in. and reciprocating the toolholder while the workpiece is rotating and the toolholder is providing a mechanical advantage of 1.5 or more for the tool as it is applied to cut the workpiece. In the preferred embodiment, the stroke is considerably less than one-half inch to keep the bandwidth high.

The result is that, in the embodiment of the invention illustrated herein, the stiffness may be 3,000,000 lbs. in. with a piston turning speed of 3,000 rpm and a tool reciprocation between 100-130 cps with the result that for some pistons, the cutting time may be reduced by about one-half.

BRIEF DESCRIPTION OF THE DRAWINGS

This invention will be described in connection with the accompanying drawings in which.

Figure 1:
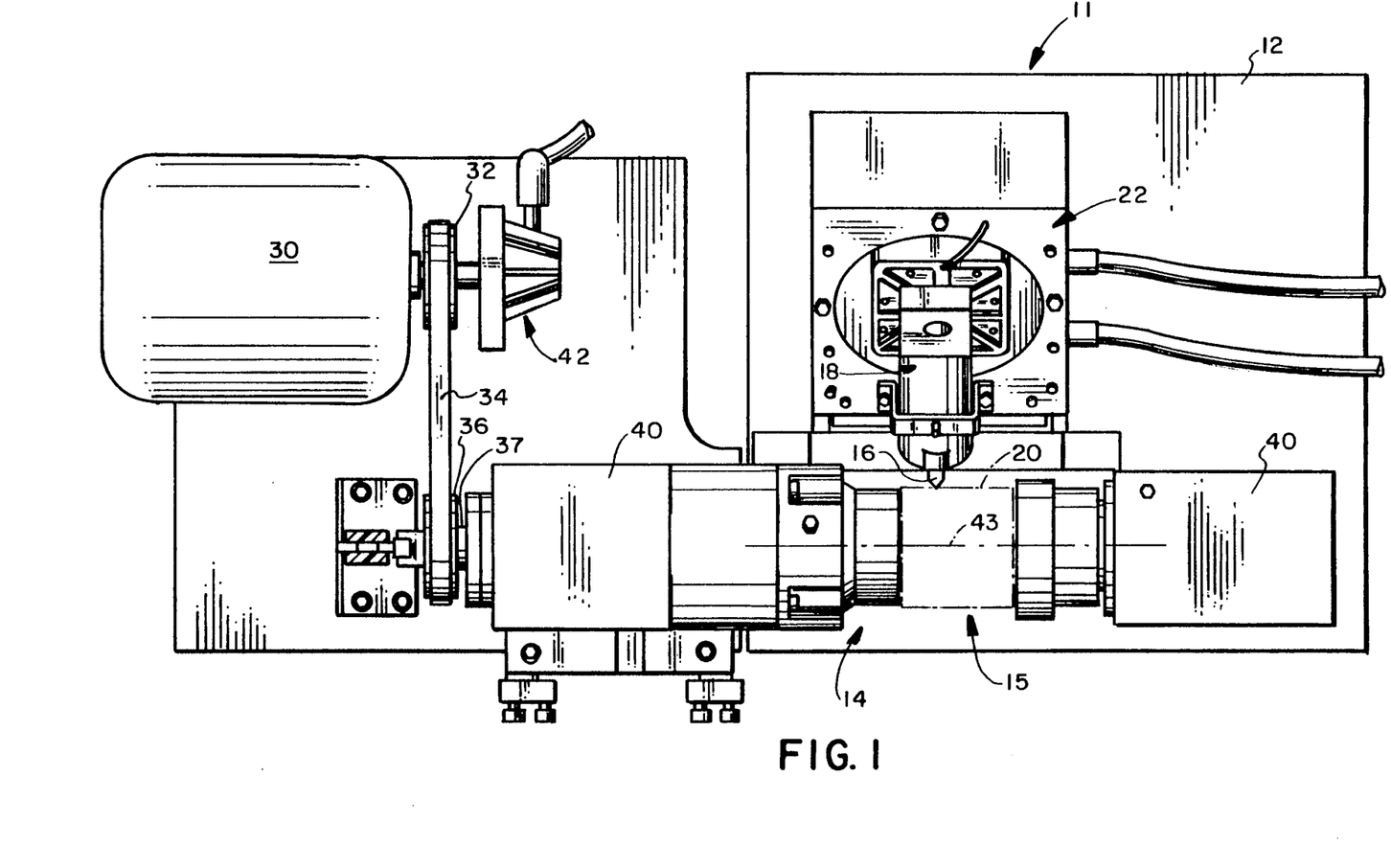
FIG. 1 is a plan view of a turning apparatus constructed in accordance with the preferred embodiment of the invention.
Figure 2:
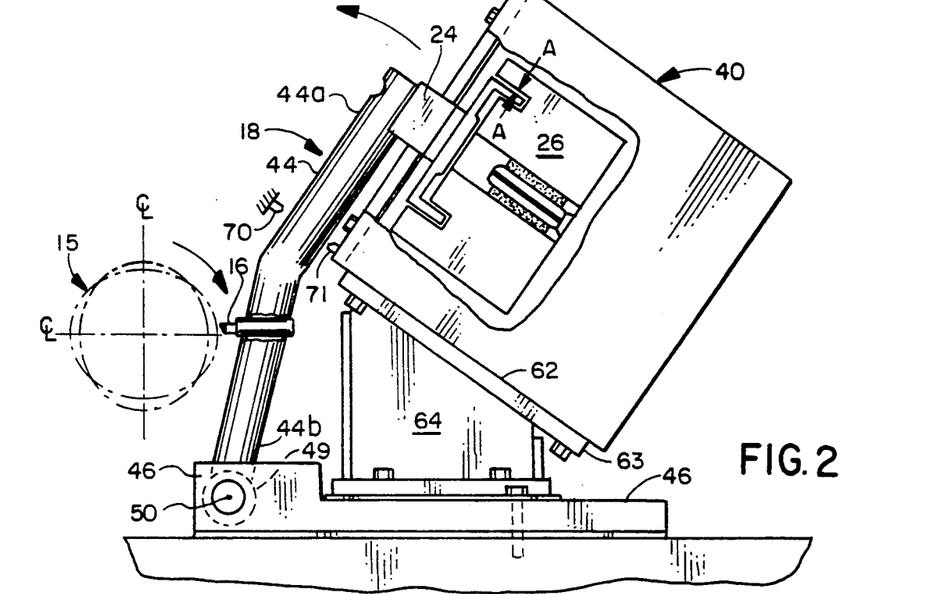
FIG. 2 is an enlarged, side elevational view of the cutting tool and pivotally mounted toolholder carrying an armature of a linear electric motor.

As shown in the drawings for purposes of illustration, the invention is embodied in a machine tool 11 having a frame 12 in which is mounted a means, such as a motor-driven spindle assembly, 14, to rotate a workpiece 15 while a tool 16 on a toolholder 18 is brought into cutting engagement with a surface 20 on the workpiece. The tool is reciprocated by a linear motor 22 which has its armature 24 (FIG. 2) mounted on the toolholder 18 and movable relative to a stationary permanent magnet 26 of the motor. The spindle assembly is driven by a motor 30 which drives a sprocket 32 and a timing belt 34 to turn a sprocket 36 mounted on a rotatable spindle shaft 37 mounted in a spindle block 40 on the frame. An encoder 42 coupled to the motor shaft provides a feedback portion signal indicative of the instantaneous angular position of the spindle assembly at any time.

The spindle assembly 14 mounts workpiece to turn about a turning axis 43 and the workpiece rotates on that axis. The illustrated workpiece 15 is a piston blank having a surface 20 in which piston ring grooves are cut as well as a contoured skirt. The contoured skirt is usually, generally elliptical in shape with two major lobes. By coordinating the motion of the tool 16 toward and from the turning axis 43, the workpiece is machined into the contoured shape. The tool is reciprocated twice for each revolution of the workpiece to cut the two lobes. By doubling the frequency, the number of major lobes in the cross-section of the workpiece may also be doubled.

The cutting tool 16 is generally a carbide or diamonded tip tool having a cutting face or edge and is mounted on the toolholder 18 which is carried on a movable table 38 which is driven in a direction parallel to the turning axis 43 to position the tool tip at different locations axially along the piston skirt. The table movement is controlled by a table controller, which in response to a programmed command sequence, moves the table to machine along the axial length of the workpiece.

Figures 5, 6, 7:
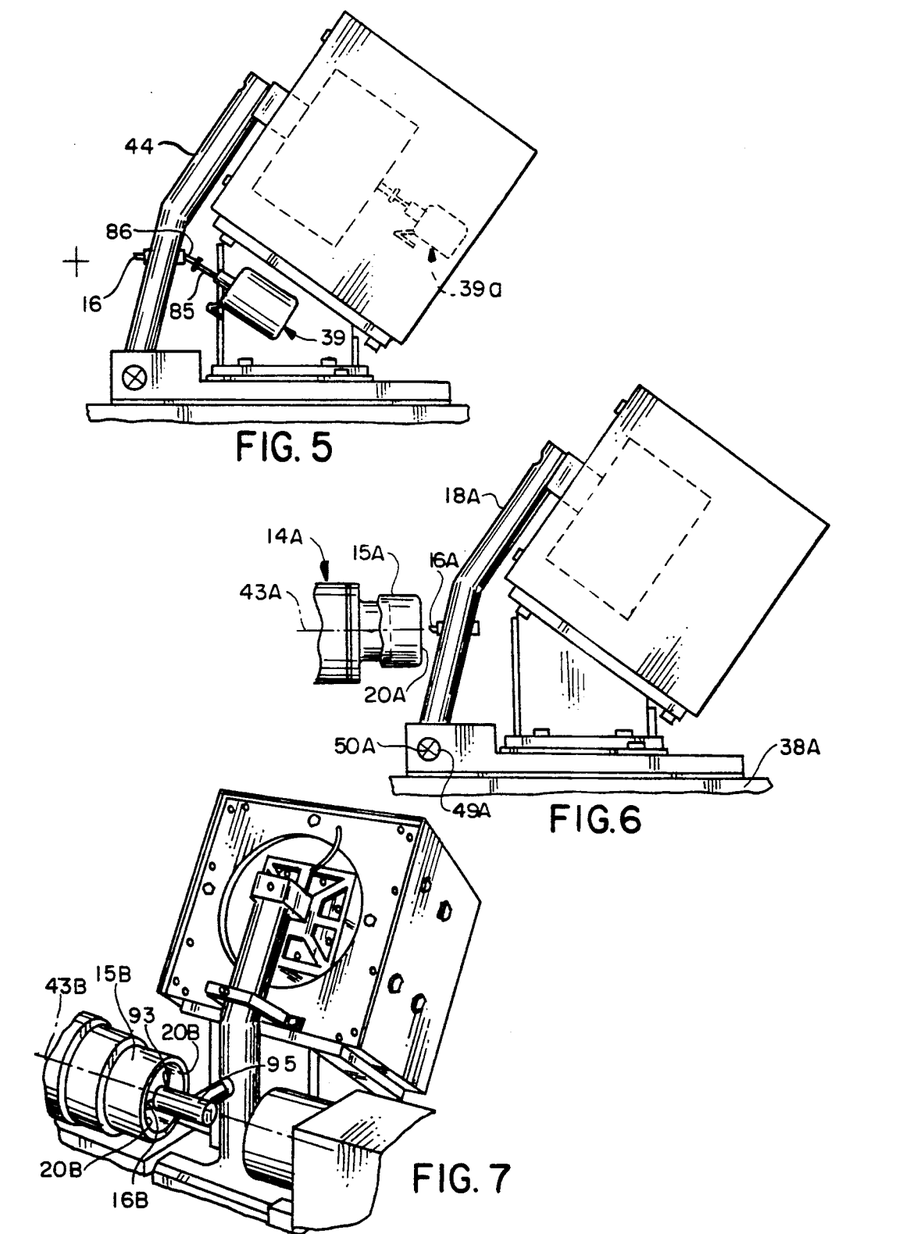
FIG. 5 is a side elevational view of the toolholder and linear drive motor having a linear feedback means for determining location of the tool cutting edge.
FIG. 6 is a side elevational view of another embodiment of the invention in which the tool is cutting an end face profile on a rotating workpiece.
FIG. 7 is a perspective view of another embodiment of the invention in which the tool is cutting an internal bore surface of the workpiece.

The tool is positioned by the linear force motor 22 which has a movable armature 24, which travels relative to a stationary permanent magnet 26. The extendable armature is positioned by means of electrical control signals which is based on the positions of the workpiece, table 38, a program profile, a tool position feedback signal from a linear feedback device 39 (FIG. 5). The control signal regulates the instantaneous position and velocity of the armature 24 of the motor, as a function of voltage. The linear force motor is adapted to reciprocate the armature from a fully extended to a fully retracted position very rapidly; and thereby move the toolholder 18 and the tool 16 between corresponding limit positions.

A suitable linear force motor is commercially available as Model LAD-300 from performance controls in Horsham, Penna.

In previous machines of this kind made by the assignee of this invention and by Cross and Trecker Company, the tool was mounted on the end of a reciprocating shaft that was mounted in bearings or bushings. The armature of the linear motor was mounted on this toolholder shaft; and the entire weight and mass of shaft, tool and armature was the apparent inertia to linear motor. Such a mass is difficult to accelerate and decelerate over a short distance; for example, less than one inch and to reverse direction of movement without a large overshoot of travel in one direction because of the momentum of the reciprocating shaft, tool and armature. For example, the machine of the assignee of this invention had a maximum effective cutting operation of tool reciprocation of 40 cycles per second with the piston being rotated at about 1,300 rpm. The force needed to overcome friction was about five or six pounds. A substantial decrease in friction and apparent moment of inertia was needed in this type of tool cutting machine. Additionally, the stiffness was limited to about 150,000 lbs. inches, which was relatively low, to provide the precision finish desired on machined articles, such as pistons, and to provide the accurate location of the tool point at any time in the cycle. When the servo force was increased in an attempt to operate at higher speeds, the tool and armature-carrying shaft could actually be made to vibrate as it tried to shift back and forth at the desired higher frequency.

In accordance with the present invention, there is provided a new and improved tool cutting machine 10 in which the toolholder 18 is pivotally mounted in frictionless bearings 49; and the armature is mounted on the toolholder for pivotal movement with the toolholder. The apparent moment of inertia at the armature is so slight that one can actually blow on the armature and pivot the armature and toolholder. The frictionless bearings allow small oscillatory movements at high frequencies without fretting corrosion, as would the common higher friction type of roller or ball bearings.

As will be explained in detail hereinafter, the preferred frictionless bearings are sold under the trademark of Lucase Free-Flex Pivot by Lucas Aerospace Power Transmission Corporation of Utica, N.Y.

Also, the stiffness of the tool may be increased about twenty fold from the assignee's previous tool cutting machine providing a substantial increase in mechanical force due to a mechanical advantage and the lack of play or looseness in the prior art systems of this kind. As will be explained in greater detail hereinafter, a mechanical advantage of about 2.5 is obtained with the illustrated tool, toolholder and armature arrangement to provide a much greater application force for the tool against the workpiece. In the assignee's prior commercial machine, the stiffness was about 150,000 lbs. inches which has been increased to about 3,000,000 lbs. inches with the result that the cutting finish is finer and the exact location of the tool is better known and may be better controlled.

Also, relative to the prior machine, the present invention results in reducing to about one-half the time needed to cut one kind of piston skirt. This is a result of the finer finish and less cuts needed to obtain the final finish for the profiled surface 20 on the workpiece. With the increased stiffness, reduced inertia, and lower friction, the same piston may be cut with the present invention with a tool reciprocation increased from about 40 cps to 100–130 cps and with a workpiece rotation increased from about 1,300 rpm to in excess of 3,000 rpm.

DETAILED DESCRIPTION OF THE PREFERRED EMBODIMENT

Turning now in greater detail to the embodiment illustrated herein, the pivotally mounted toolholder 18 preferably carries the armature 24 at its upper end and is pivoted in the frictionless bearings 49 at its lower end. The frictionless bearings 49 are mounted in bearing blocks or mounts 46 on the table 38. The apparent moment of inertia at the armature and upper end of the toolholder 18 is very small because the toolholder is preferably in the form of a lightweight, but strong hollow tubular pivot arm 44 of metal, e.g., an aluminum tube having an outer diameter of about 1.7 inch and a wall thickness of about 0.18 inch. The preferred pivot arm 44 is secured at its lower end as by welding it to a pivot block 48 (FIG. 9) which extends generally horizontal and is mounted at its opposite ends for pivoting by the frictionless bearings 49.

To provide more vertical open space above the piston workpiece and to locate the armature 24 for travel clearance with respect to the permanent magnet 26 while using a reasonable pivot arm length, the pivot arm 44 is bent at its upper end 44a at angle relative to its lower end 44b which carries the tool 16. By way of example, the upper end of the pivot arm is bent at an angle of about 22° with respect to the lower end of the pivot arm.

Although the lower pivot block portion 48 of the toolholder 18 is heavier and has more mass, it is close to a horizontal pivot axis 50 for the toolholder and moves through a small distance so that it does not have a large effect on the apparent movement of inertia at the armature 24, as seen at the permanent magnet 26.

To increase the stiffness and the force of application of the tool to the workpiece, the tool 16 is mounted on the pivotal toolholder 18 to have a large mechanical advantage, e.g., about 2.5, in this instance. Manifestly, the mechanical advantage may be increased or decreased from that illustrated herein. The mechanical advantage is calculated as 2.5 because the radial distance from the center of the armature 24 to the pivot axis 50 is 12.5 inches; and the radial distance from the tool cutting edge to the pivot axis 50 is five inches.

Figures 3, 4:
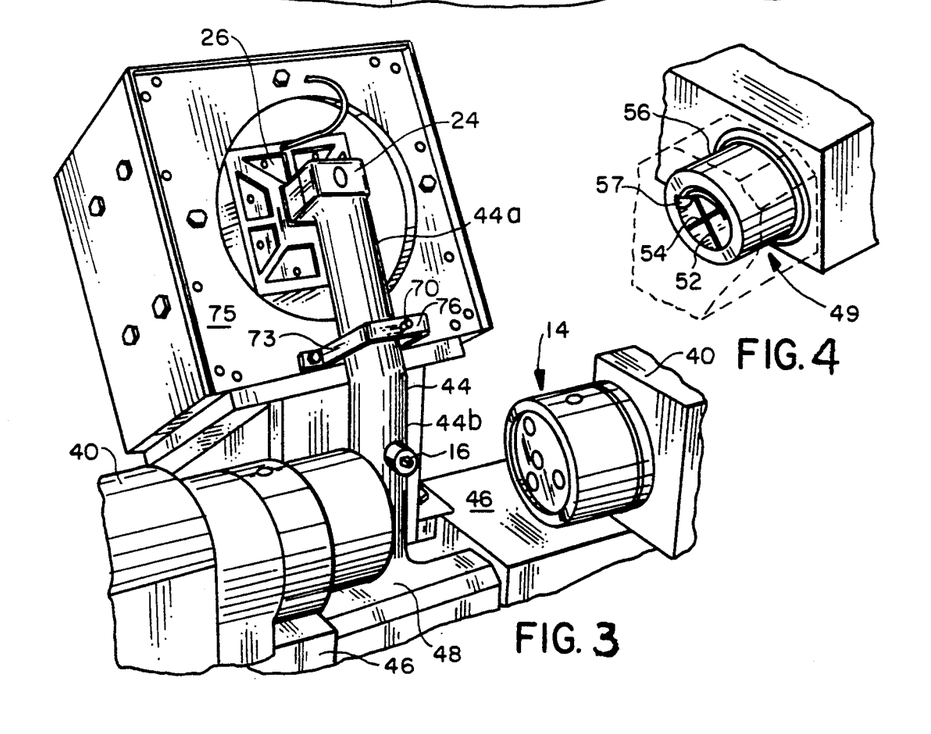
FIG. 3 is a front perspective view of the spindle assembly, toolholder and electric motor of the apparatus shown in FIG. 1.
FIG. 4 is a fragmentary, diagrammatic view of a portion of a frictionless bearing used to pivotally mount the toolholder.

The significant reduction in friction achieved herein is the result of the use of the frictionless bearings 49 and the pivoted arm toolholder 18 with the small apparent moment of inertia at the armature. The prior design of the assignee of this invention had a standing, or at rest friction, of 5 or 6 lbs. for the toolholder that needed to be overcome to move it; whereas the pivot armature toolholder herein can be moved with about one-half of an ounce of force. Indeed, one can actually blow on the armature and pivot the toolholder. The illustrated frictionless bearings comprise a pair of leaf springs 52 and 54 with one of the leaf springs 54 being joined at one end to the bushing 56 and the other leaf spring 52 being joined being joined at the illustrated end 57 to a similar pair of leaf springs 59 and 60 buried within a bore 58 (FIG. 9) of the pivot block of the toolholder 18. When the leaf springs are bent during rotation of the toolholder from its true vertical position, the bent springs store energy and this energy is used to assist the linear motor in returning the toolholder in the opposite direction. These frictionless bearings are particularly suited for this frequency oscillatory type of movement of about 30° or less. Ball or roller bearings or bushings tend to fretting corrosion when exposed to such operating conditions. The term "frictionless bearings" as used herein means bearings of a very small amount of friction and substantially no looseness, as described herein. There is no looseness or lost motion in these crossed leaf spring bearings. In the usual ball or roller bearings there is looseness and some backlash. The same goes for bushing type of bearings. Looseness, backlash or lost motion in the bearings results in a substantial loss of "stiffness".

The tool 16 is preferably mounted on the toolholder arm 44 at a substantially horizontal position so that the cutting edge travels as close as to a horizontal path as possible as it swings through a small arc about the pivot axis 50 as it travels through a small distance, e.g., ±0.050 inch. The tool 16 is thus normal to the axis of the lower portion of the cylindrical pivot arm. Herein, the lower portion of the arm is illustrated at about 13° relative to the vertical. Thus, the arm pivots through a very small arc to provide the maximum displacement of 0.100 inch herein for the turning tool. Manifestly, this distance and arcuate travel may be increased substantially from that described herein. One manner to increase tool displacement or tool travel is to provide a different clearance between the armature and the permanent magnet, as will now be described.

The linear motor 22 is mounted herein with its axis for the armature travel being inclined at an angle of 35° to the horizontal. The motor 22 has a lower inclined side 62 (FIG. 2) secured to an inclined plate 63 of a stand 64 which is bolted to the base 46 which also supports the toolholder mounting blocks and the toolholder 18. The permanent magnet is formed with 0.020 inch radial air gap at the maximum, as indicated between the arrows A—A in FIG. 2, when armature is positioned at its upper limit position and about 0.004 air gap when the armature is fully drawn in the permanent magnet. The difference in the air gap is due to the fact that the armature is in fact rotating about the pivot axis 50 for the pivot arm 44 on which the armature is located. That is, the armature does not travel in a straight line at 35° to the horizontal, but swings with some lateral movement toward or away from the adjacent permanent magnet wall as it pivots about the pivot point 50. By changing the design of the motor to provide a larger clearance between the armature and the permanent magnet, the tool displacement distance may be increased.

It is preferred to provide safety stops 70 and 71 which limit the total movement of the armature 24 so that it does engage the permanent magnet 26. Herein, a pair of safety stops 70 and 71, as shown diagrammatically in FIG. 2, will abut the pivot arm 44 to limit pivoting of the toolholder 18. As best seen in FIG. 3, a U-shaped bracket 73 may be secured to the motor housing 75 and it has a horizontal arm 76 for carrying the outer limit stop 70, which has an inner end to abut the pivot arm if the pivot arm travels substantially beyond the usual +0.050 inch of travel. The inner stop 81 on the motor housing will be abutted if the pivot arm travels substantially beyond −0.050 inch to stop further rotation of the pivot arm. Thus, the stops 70 and 71 are ineffective during normal tool cutting operations that take place, in this instance within ±0.050 inch. The stops are adjustable, for example, threaded screws may be threaded into the horizontal bracket arm 76 and turned to bring the inner free end of the screw toward or from the pivot arm 44.

A linear feedback means 39 (FIG. 5) is used to sense the position of the tool with respect to the location of the tool tip at any given instant. As best seen in FIG. 5, the linear feedback means is mounted on the outside of the motor 22 and has an arm 85 mechanically coupled by a coupling 86 to the pivot arm 44 at the location of the tool 16. An electrical output from the linear feedback means is provided as the pivot arm shifts the tool 16 during the machining operation. As shown in FIG. 5 in phantom lines, a linear feedback means 39a may be substituted for the linear feedback means 39 and mechanically coupled to the armature 24 to provide an electrical output indicative of the position of the armature and thereby, the position of the tool 16 because both the armature and tool are mounted on the pivot arm 44. Manifestly, the particular form of feedback means to determine the exact location of the tool tip at any point in time may be varied as may its location with respect to the tool. A simple, linear feedback means is preferred.

In the embodiment of FIG. 6, there is disclosed an end facing operation in which the end face of a workpiece 15A is being cut to a profile by a tool 16A mounted on the toolholder 18A. The same reference characters as used before in the embodiments of FIGS. 1-5, are used to describe the embodiment of FIG. 6 but with a "suffix A" added thereto. In this embodiment, the workpiece 15A is rotated by a spindle assembly 14A. Whereas, the tool 16 in FIGS. 1-5 was moved in a direction substantially normal to the rotational axis 43 through the spindle assembly and workpiece with the pivot axis 50 of the toolholder being in a plane parallel to the spindle rotational axis 43, the pivot axis 50A through the frictional bearings 49A in FIG. 6 is a plane perpendicular to the spindle rotational axis 43A. The profile is cut by tool point moving in or out relative to the end surface 20a on the workpiece. Also, the table 38A may be moved vertically and horizontally relative to the end face 20a to position the tool across the entire end face of the workpiece, if so desired.

In the embodiment of FIG. 7, a suffix "B" has been added to the reference characters to describe the previously describe elements of an apparatus which is performing an internal boring operation. More specifically, the tool 16B is located within an internal, hollow bore 93 at the end of the workpiece 15B with the contoured surface 20B having the lobes formed therein by the tool 16B as it is oscillated by the linear motor 22B. The tool 16B is mounted on an adapter 95 extending substantially parallel to the rotational axis 48B for the workpiece. The tool 16B being oscillated radially inwardly and outwardly to cut a profile or lobed interior surface 20B within the bore 93 of the workpiece.

Figures 8, 9:
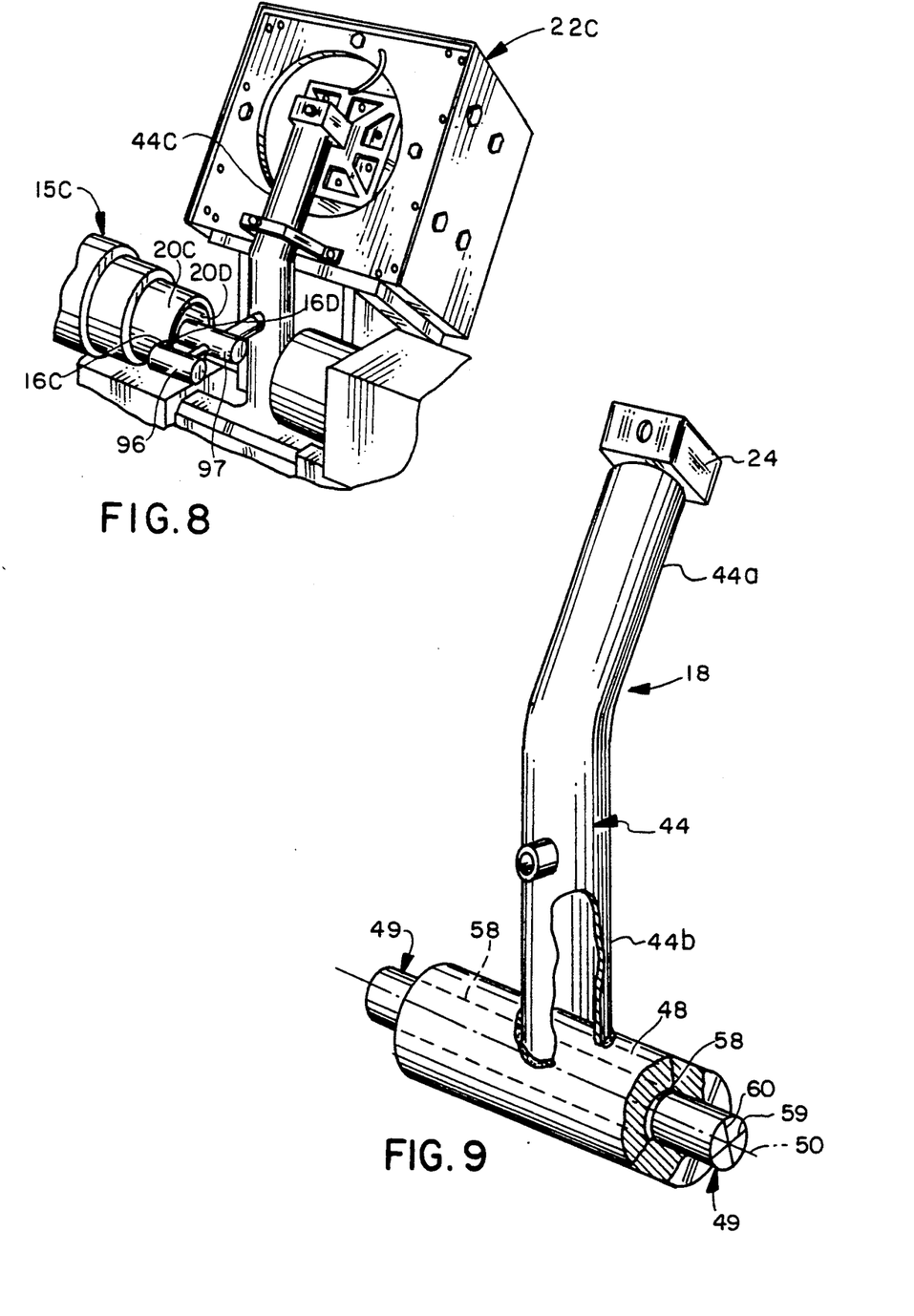
FIG. 8 is perspective view of another embodiment of the invention in which a pair of tools on the toolholder are simultaneously cutting non-circular profiles on the inner and outer skirt surfaces of a workpiece to provide a constant wall thickness for the skirt.
FIG. 9 shows the preferred embodiment of the pivot arm.

In the embodiment of FIG. 8, the rotating workpiece 15C may be provided with a substantially uniform cross-sectional thickness between an outer surface 20C and interior surface 20D being formed with lobes. The lobes have a constant wall thickness therebetween as does the remainder of the skirt of the workpiece being machined by cutting tools 16C and 16D. The tips of the cutting tools 16C and 16D are spaced apart by a predetermined, constant distance. The tool 16C being mounted on the end of an adaptor 96 and the tool 16D being mounted on the end of an adaptor 97 parallel to the other adaptor 96. As the pivot arm 44C oscillates, both cutting tools are moved in a radial direction together; and both the inner and outer walls on the skirt of the workpiece are being machined simultaneously to provide a non-circular profile for the inner and outer surfaces of the skirt. The profile may be a pair of lobes to provide the elliptical shape, as described above. The use of a dual cutting action should cut the machining time in half from the present system in which an outer contoured cut by a first tool is first made and then an interior cut is made by a tool on the interior bore wall to match the outer surface contour so that the skirt wall thickness is maintained constant about the circumference of the skirt.

The present invention provides a robustness, i.e., a tolerance to change—for example, in tool bits or cutting tools, this robustness not being present in the aforementioned, conventional cutting machines. The present invention supplies sufficient force and has such a tight servo loop with little looseness or lost motion that it can use various tools and can cut various metals and materials including steels, as well as aluminum. The present invention provides a cutting tool system that is lighter and stronger and can be configured to allow the cutting of outer surface contours, interior surface contours, or simultaneously, both an inner and an outer surface contour. The present invention is also robust in that it allows for easy changes in the computer programs that control the tool position and in that different linear motor actuators may be used in lieu of the linear motor actuator described in this preferred embodiment of the invention.

From the foregoing, it will be seen that the present invention provides a new and improved turning tool that has a very low, apparent moment of inertia, low friction and high stiffness. This is achieved by mounting the armature adjacent an end of a pivoted tool holder and having a substantial mechanical advantage to provide a substantial increase in force applied by the tool against the workpiece. A stiffness of 3,000,000 lbs. inches for the present invention represents a twenty-fold increase in stiffness over the assignee's prior commercial machine of this general kind. The combination of these various features results in an overall increase in cutting speed and rotational cycles per second with finer and faster machining of surface of the workpiece.

The foregoing description and drawings merely explain and illustrate the invention and the invention is not limited thereto, except insofar as the appended claims are so limited. Those who are skilled in the art and have the disclosure before them will be able to make modifications and variations therein without departing from the scope of the invention.

What is claimed is:

1. A machine tool for machining a rotating workpiece to a predetermined profile by reciprocation movements of the tool during a revolution of the workpiece, said machine tool comprising:
    a frame,
    means on the frame for rotating the workpiece at a predetermined velocity,
    a toolholder on the frame for holding the tool for reciprocating movements to bring the tool into engagement with the rotating workpiece to machine the surface thereof to the profile,
    bearing means mounting the toolholder relative to the frame for pivoting movement with low friction,
    a linear motor mounted on the frame for pivoting the toolholder on the bearing means to move the tool into cutting engagement with the rotating workpiece,
    an armature of the linear motor mounted on the toolholder,
    the armature being positioned on the toolholder and spaced from the tool on the toolholder to provide a mechanical advantage of about two or greater to increase the force of application of the tool to the workpiece while maintaining a low moment of inertia for the combined armature and toolholder.

2. A machine tool in accordance with claim 1 in which the toolholder includes a pivot arm, the lower portion of the pivot arm carries the tool and is at a first angle to the vertical, the upper portion of the arm carries the armature and is bent at angle to the lower portion of the arm.

3. A machine tool in accordance with claim 1 in which the bearings include at least one spring plate therein for bending with pivoting of the toolholder.

4. A machine tool in accordance with claim 1 in which the means for rotating the workpiece positions an end face in front of tool and rotates the work piece while the tool cuts the profile surface on an end face of the work piece.

5. A machine tool in accordance with claim 1 in which the pivot axis for the toolholder is parallel to the rotational axis for the workpiece, the tool performing a boring operation to form the profile surface in a bore in the workpiece.

6. A machine tool in accordance with claim 1 in which a first tool is mounted on the toolholder to cut an interior surface and a second tool is mounted on the toolholder to cut an outer surface on the workpiece, the tools being held at a constant distance from each other and forming non-circular inner and outer surface on the workpiece which are spaced apart at a predetermined constant wall thickness therebetween.

7. A machine tool in accordance with claim 1 in which the toolholder is positioned upright with the bearing means being at the lower end of the toolholder and the armature being positioned at the upper end of the toolholder and the tool being located between the armature and the bearing means.

8. A machine tool in accordance with claim 7 in which the tool is located in a substantial horizontal plane, the toolholder is inclined at an angle to the vertical and the linear motor is also mounted an inclination to the vertical.

9. A machine tool in accordance with claim 1 in which the linear motor has a permanent magnet fixedly mounted, the armature moves relative to the permanent magnet, and a linear position feed back means is connected to the armature.

10. A machine tool in accordance with claim 9 in which the linear position feed back means comprises a core connected to the armature to be displaced with displacement of the armature and a winding about the core.

* * * * *